(12) United States Patent
Geerlings et al.

(10) Patent No.: US 11,130,195 B2
(45) Date of Patent: Sep. 28, 2021

(54) LASER ABLATION WITH REDUCED VISUAL EFFECTS

(71) Applicant: Gentex Corporation, Zeeland, MI (US)

(72) Inventors: Kurtis L. Geerlings, Zeeland, MI (US); David J. Cammenga, Zeeland, MI (US); Donald L. Bareman, Zeeland, MI (US); Henry A. Luten, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 129 days.

(21) Appl. No.: 15/329,931

(22) PCT Filed: Jul. 29, 2015

(86) PCT No.: PCT/US2015/042754
§ 371 (c)(1),
(2) Date: Jan. 27, 2017

(87) PCT Pub. No.: WO2016/019071
PCT Pub. Date: Feb. 4, 2016

(65) Prior Publication Data
US 2017/0239749 A1    Aug. 24, 2017

Related U.S. Application Data

(60) Provisional application No. 62/030,498, filed on Jul. 29, 2014.

(51) Int. Cl.
*B23K 26/082* (2014.01)
*B23K 26/361* (2014.01)
(Continued)

(52) U.S. Cl.
CPC ........ *B23K 26/082* (2015.10); *B23K 26/0622* (2015.10); *B23K 26/14* (2013.01);
(Continued)

(58) Field of Classification Search
CPC .............. B23K 26/082; B23K 26/0622; B23K 26/361; B23K 26/14; B23K 26/362; B23K 26/402
(Continued)

(56) References Cited

U.S. PATENT DOCUMENTS 5,501,944 A    3/1996  Hill et al.
5,668,663 A    9/1997  Varaprasad et al.
(Continued)

FOREIGN PATENT DOCUMENTS

CA    2644218 A1    9/2007
CN    1648715 A     8/2005
(Continued)

OTHER PUBLICATIONS

International Search Report and Written Opinion for PCT/US2015/042754 (8 pages).
(Continued)

*Primary Examiner* — Tu B Hoang
*Assistant Examiner* — Alba T Rosario-Aponte
(74) *Attorney, Agent, or Firm* — Foley & Lardner LLP; Bradley D. Johnson

(57) ABSTRACT

A laser ablation process can be configured to reduce the appearance of or eliminate a potentially objectionable diffraction effect that can occur when a workpiece or product that has been subjected to the ablation process interacts with light. The diffraction effect can be reduced by introducing irregularity into the arrangement of overlapping laser spots during the process. Other process parameters may be modified to reduce the diffraction effect, such as laser scan speed, laser pulse frequency, the position of the focal plane of the laser, the configuration of raster lines, or the energy profile of the laser beam, for example. The process modifications and configurations are particularly useful with products (Continued)

including an ablated surface that is intended to reflect light or to allow light to pass therethrough as part of its function.

12 Claims, 3 Drawing Sheets

(51) Int. Cl.
*G02B 5/08* (2006.01)
*B23K 26/0622* (2014.01)
*B23K 26/14* (2014.01)
*B23K 26/362* (2014.01)
*B23K 26/402* (2014.01)
*G02B 27/00* (2006.01)
*B23K 103/08* (2006.01)
*B23K 103/16* (2006.01)
*G02B 5/18* (2006.01)

(52) U.S. Cl.
CPC .......... *B23K 26/361* (2015.10); *B23K 26/362* (2013.01); *B23K 26/402* (2013.01); *G02B 5/08* (2013.01); *G02B 27/0012* (2013.01); *B23K 2103/08* (2018.08); *B23K 2103/172* (2018.08); *G02B 5/1857* (2013.01); *G03H 2260/62* (2013.01)

(58) Field of Classification Search
USPC ............... 219/121.67–121.69, 121.8, 121.85
See application file for complete search history.

(56) References Cited

U.S. PATENT DOCUMENTS

| | | | | |
|---|---|---|---|---|
| 6,066,830 A * | 5/2000 | Cline | .................. | B23K 26/073 |
| | | | | 219/121.69 |
| 6,075,223 A * | 6/2000 | Harrison | ................ | B41M 5/262 |
| | | | | 219/121.85 |
| 8,842,358 B2 | 9/2014 | Bareman et al. | | |
| 8,927,069 B1 | 1/2015 | Estinto et al. | | |
| 2002/0033558 A1* | 3/2002 | Fahey | .................... | B23K 26/40 |
| | | | | 264/400 |
| 2002/0044271 A1* | 4/2002 | Leigh-Jones | ......... | G02B 5/1842 |
| | | | | 356/71 |
| 2003/0058986 A1 | 3/2003 | Oshino et al. | | |
| 2003/0075531 A1* | 4/2003 | Kupisiewicz | ......... | B08B 7/0042 |
| | | | | 219/121.69 |
| 2003/0127441 A1* | 7/2003 | Haight | .................. | B23K 26/032 |
| | | | | 219/121.84 |
| 2004/0031778 A1 | 2/2004 | Koyama et al. | | |
| 2005/0195488 A1 | 9/2005 | McCabe et al. | | |
| 2005/0231105 A1 | 10/2005 | Lovell et al. | | |
| 2006/0020092 A1 | 1/2006 | Chikusa et al. | | |
| 2006/0134349 A1 | 6/2006 | Chari et al. | | |
| 2007/0206263 A1 | 9/2007 | Neuman et al. | | |
| 2008/0050888 A1 | 2/2008 | Garner | | |
| 2009/0212292 A1 | 8/2009 | Hayton et al. | | |
| 2010/0132988 A1 | 6/2010 | Valentin et al. | | |
| 2011/0017280 A1* | 1/2011 | Rumsby | ............. | B23K 26/0626 |
| | | | | 136/251 |
| 2011/0017602 A1 | 1/2011 | Khosla | | |
| 2011/0036802 A1* | 2/2011 | Ronsin | .................. | A45D 34/02 |
| | | | | 215/12.2 |
| 2012/0200007 A1 | 8/2012 | Straw et al. | | |
| 2012/0225250 A1 | 9/2012 | Kuznetsov et al. | | |
| 2012/0229882 A1 | 9/2012 | Fish et al. | | |
| 2012/0273472 A1* | 11/2012 | Unrath | ............... | B23K 26/0732 |
| | | | | 219/121.73 |
| 2013/0020297 A1 | 1/2013 | Gupta et al. | | |
| 2013/0081951 A1 | 4/2013 | Hankey et al. | | |
| 2013/0112679 A1* | 5/2013 | Van Wyhe | ............. | H05B 3/845 |
| | | | | 219/202 |
| 2013/0153428 A1 | 6/2013 | Akana et al. | | |
| 2013/0248837 A1 | 9/2013 | Yokoyama | | |
| 2013/0337260 A1 | 12/2013 | Tapio et al. | | |
| 2014/0036338 A1 | 2/2014 | Bareman et al. | | |
| 2014/0176836 A1 | 6/2014 | Brecht et al. | | |
| 2015/0125626 A1 | 5/2015 | Sakoske et al. | | |
| 2016/0093763 A1 | 3/2016 | Rana et al. | | |
| 2016/0114523 A1 | 4/2016 | Luten et al. | | |
| 2016/0370680 A1 | 12/2016 | Geerlings et al. | | |

FOREIGN PATENT DOCUMENTS

| | | |
|---|---|---|
| EP | 0 729 864 A1 | 9/1996 |
| EP | 1 503 906 B1 | 11/2011 |
| GB | 0 896 934 A | 5/1962 |
| JP | H08(1996)253077 | 10/1996 |
| JP | 2008524654 | 7/2008 |
| JP | 2009508321 | 2/2009 |
| JP | 2009529153 | 8/2009 |
| JP | 2012128457 | 7/2012 |
| JP | 2012168439 | 9/2012 |
| RU | 2287414 C1 | 11/2006 |
| RU | 2390425 C1 | 5/2010 |
| TW | 201325798 A | 7/2013 |
| WO | WO-2008/119949 A1 | 10/2008 |
| WO | WO-2013/090209 A1 | 6/2013 |
| WO | WO-2014/060203 | 4/2014 |
| WO | WO-2014/060203 A1 | 4/2014 |

OTHER PUBLICATIONS

Extended European Search Report in EP16812567.2 dated May 7, 2018 (10 pages).
International Preliminary Report on Patentability issued in PCT/US2016/038199 dated Dec. 19, 2017.
Non-final Office Action issued in U.S. Appl. No. 15/186,164 dated Sep. 11, 2017.
Office Action issued in CN2015800539895 dated Jan. 10, 2018 (21 pgs. inc. translation).
U.S. Office Action on U.S. Appl. No. 15/186,164 dated Sep. 11, 2017.
International Search Report issued in PCT/IB2018/052220 dated Jul. 12, 2018.
Extended European Search Report in EP15846699.5 dated Sep. 25, 2017 (10 pages).
Extended European Search Report issued in corresponding European Patent Application No. 15828028.9, dated Apr. 3, 2018.
International Search Report and Written Opinion for PCT/US2016/038199 dated Sep. 30, 2016 (17 pages).
International Search Report and Written Opinion in PCT/US2015/053850 dated Dec. 18, 2015 (10 pages).
U.S. Notice of Allowance on U.S. Appl. No. 14/874,263 dated Oct. 5, 2017.
U.S. Office Action on U.S. Appl. No. 14/874,263 dated Jan. 12, 2017.
U.S. Office Action on U.S. Appl. No. 14/874,263 dated Jul. 13, 2017.
English Translation of Office Action Issued in Japanese Application No. 2017-565946, dated Feb. 4, 2019, 6 pages.

* cited by examiner

LASER ABLATION WITH REDUCED VISUAL EFFECTS

This application claims the benefit of U.S. Provisional Application Ser. No. 62/030,498 filed Jul. 29, 2014, the entire contents of which are hereby incorporated by reference.

TECHNICAL FIELD

The present disclosure generally relates to laser ablation processes and products produced thereby.

BACKGROUND

Laser ablation is a process that has been used to remove material or layers of materials from workpieces. However, very little is known about the effects of laser ablation on the optical properties of a workpiece or product that has been subjected to a laser ablation process.

SUMMARY

In accordance with one or more embodiments, a laser ablation process removes material from a workpiece surface at a plurality of irregularly arranged locations, thereby reducing the appearance of or eliminating a diffraction effect that can occur when the ablated workpiece surface interacts with light.

In accordance with one or more embodiments, a laser ablation process that produces a diffraction grating at an ablated surface may be modified in a manner that reduces the visibility of the diffraction grating.

In one or more embodiments, the step of modifying comprises decreasing a scan speed of the laser ablation process, increasing a laser pulse frequency of the laser ablation process, or both.

In one or more embodiments, the laser ablation process is performed at more than one laser pulse frequency.

In one or more embodiments, the laser ablation process is performed at more than one scan speed.

In one or more embodiments, at least a portion of the laser ablation process is performed with a defocused laser beam.

In one or more embodiments, the laser ablation process is performed along non-parallel raster lines.

In one or more embodiments, at least a portion of the laser ablation process is performed along a curvilinear raster line.

In one or more embodiments, the laser ablation process is performed with wobble in the laser beam delivery system.

In one or more embodiments, the laser ablation process uses a laser beam with a non-Gaussian energy profile, a flat energy profile, or both.

In one or more embodiments, the laser ablation process includes use of an index-matching fluid.

In accordance with one or more embodiments, a product is produced according to any of the laser ablation processes listed above.

In one or more embodiments, the product includes a transparent substrate from which a metal layer has been removed by the laser ablation process.

In one or more embodiments, the product includes a glass substrate from which a layer comprising chromium has been removed by the laser ablation process.

In one or more embodiments, there is provided a mirror that includes any of the products listed above.

BRIEF DESCRIPTION OF THE DRAWINGS

Illustrative embodiments will hereinafter be described in conjunction with the appended drawings, wherein like designations denote like elements, and wherein.

DETAILED DESCRIPTION OF ILLUSTRATIVE EMBODIMENTS

A laser ablation process generally includes selective removal of material at a surface of a workpiece by directing a laser beam at the workpiece. The laser beam is configured to deliver a controlled amount of energy at a laser spot defined where the beam impinges the desired surface. This controlled amount of energy is selected to liquefy, vaporize, or otherwise rapidly expand the surface material at the laser spot to cause it to separate from the workpiece for removal. Laser ablation can be used to remove at least a portion of one or more coatings from a coated substrate, for example, or to otherwise reshape the workpiece surface.

In order to remove material from an area of the workpiece that is larger than the laser spot, the laser beam and/or the workpiece may be moved relative to each other to ablate material at a plurality of adjacent and/or overlapping laser spot locations. For instance, after the desired amount of material is removed at a first laser spot, the workpiece and/or laser beam may be indexed to define a second laser spot for removal of material at the second laser spot. Continued indexing to multiple adjacent or overlapping laser spot locations with corresponding material removal at each location defines an ablated area of the workpiece.

A high-frequency pulsed laser may be used in conjunction with workpiece and/or laser beam movement at a particular rate in a process direction to determine the spacing between adjacent laser spots. For example, a laser beam operating with a pulse frequency of 400 kHz with a relative rate of movement between the workpiece and the laser beam of 20 m/s in the process direction will result in laser spots every 50 µm in the process direction. A single pulse or a pulse burst may be delivered at each laser spot location, where the pulse durations are generally one or more orders of magnitude less than the time between pulses. Spacing between laser spots may be selected so that adjacent spots at least partially overlap to ensure material removal between adjacent spots.

Figure 1:
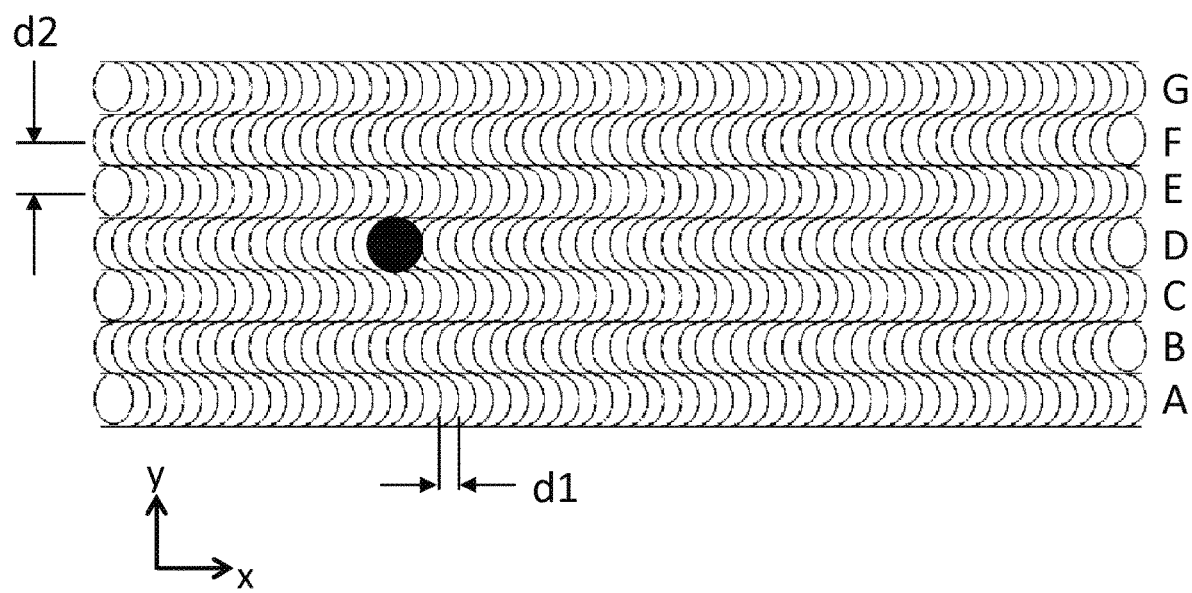
FIG. 1 is a schematic view of a laser-ablated surface.

FIG. 1 illustrates an example of an area of a workpiece after material has been removed by a laser ablation process performed along a plurality of overlapping laser spot locations. In FIG. 1, D1 represents the spacing between adjacent laser spots in the x-direction (i.e., the process direction), and D2 represents the spacing between adjacent rows A-G of laser spots in the y-direction (i.e., the transverse direction). The location of an arbitrary single laser spot is darkened in row D for illustrative purposes. The shape of each laser spot is generally circular. Depending on the manner of laser beam/substrate movement in the process direction, a circular laser beam may form elliptical laser spots. In this particular example, the diameter of the laser spots is approximately the same as the spacing D2 between rows, and the spacing D1 between laser spots in the process direction is approximately ⅓ the diameter of the laser spots. Also in this example, the process direction of one row is opposite from the process direction of an adjacent row. In particular, the process direction of row A of FIG. 1 is from left-to-right, the process direction of row B is right-to-left, row C is left-to-right, etc. Thus each line in FIG. 1 represents the location of a portion of the perimeter or edge of an individual laser spot.

Spot size, shape, and or overlap in the x- and/or y-directions may be different than illustrated in FIG. 1. But for a typical laser ablation process, where the scan speed in the process direction (e.g. with a galvanometer-based beam delivery system) is constant, the pulse frequency of the laser beam is constant, and row-to-row spacing is constant, the result is a regular or uniform pattern of laser spots. Scanning speed and amount of laser spot overlap for a laser ablation process configured to remove a coating from a substrate is typically optimized to the lowest cycle time capable of visibly removing all of the desired coating in the desired area.

Figure 2:
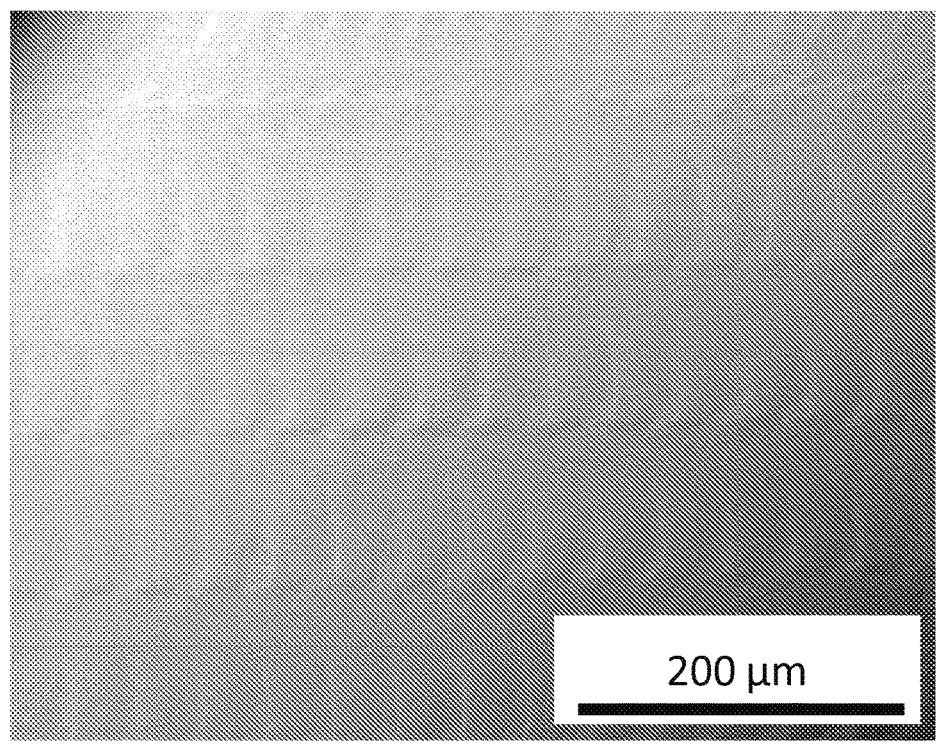
FIG. 2 is a photomicrograph of a laser-ablated surface.

In some instances, such a regular pattern of laser spots can lead to undesirable visual effects at the ablated surface. This is because the individual laser spot locations indicated in FIG. 1 are not always merely theoretical locations. Rather, the laser spot pattern is physically ascertainable. While not always visible to the naked eye with small laser spots and laser spot spacing, a pattern reminiscent of the laser spot perimeter pattern depicted in FIG. 1 may be visible under magnification as shown in FIG. 2. FIG. 2 is a photomicrograph of a glass substrate after a chromium coating layer was removed by laser ablation. Horizontal rows (i.e., raster lines) of overlapping laser spots are apparent in FIG. 2, along with the resulting regular or uniform pattern. While not entirely understood, the appearance of the pattern is apparently due to material alteration at the surface of the substrate where the coating was removed and/or residual coating was not removed. For instance, when laser parameters are adjusted to ensure removal of a coating on the micron scale, some small amount of substrate material (e.g., on the nanometer or Angstrom scale) may also be removed at each laser spot. Or the laser parameters may be such that an invisibly thin residual coating is left behind after ablation at each laser spot. These effects may occur when a coating is removed from a substrate or from another coating layer, when a coating is partially removed from a substrate or another coating layer, or when a unitary or monolithic substrate undergoes laser ablation to alter the size or shape of the substrate.

While the regular pattern of FIG. 2 is not necessarily visible to the naked eye, its existence may become apparent when light is either transmitted through or reflected off of the ablated surface. For example, the regular arrangement of horizontal raster lines or rows of laser spots may appear as horizontal diffraction lines when visible light is shone through the substrate or reflected from the ablated surface. Also, the regular vertical arrangement and general alignment of edges of laser spots in a plurality of adjacent rows may appear as vertical diffraction lines under similar circumstances. The vertical diffraction lines that may appear with the patterns of FIGS. 1 and 2 are not perfectly straight vertical lines, they may appear generally straight to the when observed without magnification. A plurality of spaced apart horizontal or vertical diffraction lines may be referred to as a diffraction grating. These diffraction gratings can be undesirable in certain applications. For instance, in applications where the ablated surface is the surface of a transparent material, such as glass, amorphous plastic, etc., used in an application where the material is intended to be effectively invisible (e.g., a window or mirror), diffraction patterns produced as a result of the diffraction gratings that appear in the presence of light are undesirable. Similarly, where the ablated surface is intended for service as a reflective surface (e.g., a mirror), diffraction patterns that appear in the presence of light are likewise undesirable.

This appearance of otherwise invisible witness lines that results from typical laser ablation processes is somewhat particular to transparent and reflective ablated surfaces in applications where the ablated surface is part of a visible product that relies on its reflective or transparent properties as part of its function in service. While not intended to be a complete explanation of the presence of visual defects in such products, the following general explanation of diffraction patterns may help explain some of the undesired effect of regular or uniform ablation patterns on some visible surfaces.

Figure 3:
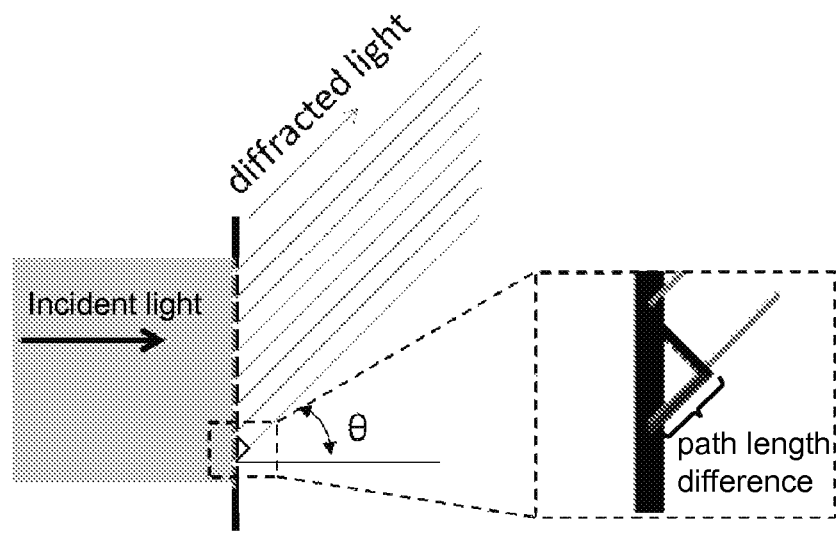
FIG. 3 illustrates diffraction of light by a diffraction grating.

FIG. 3 generally illustrates how a diffraction pattern is generated by a diffraction grating in the form of a repeated pattern of slits. As shown, incident light transmitted through a plurality of slits will produce a diffraction pattern. The diffraction pattern includes an array of alternating light and dark spots (or lines) determined by the interference of light passing through different slits. The indicated line in the inset of FIG. 3 shows the path length difference for light passing through two adjacent slits. If this path length is a multiple of a complete wavelength, then a bright spot will be observed due to constructive interference. If this path length is an odd multiple of half wavelengths, then a dark spot will be observed due to destructive interference. Since this path length depends on angle, an alternating pattern of light and dark spots will be observed as a diffraction pattern.

Figure 4:
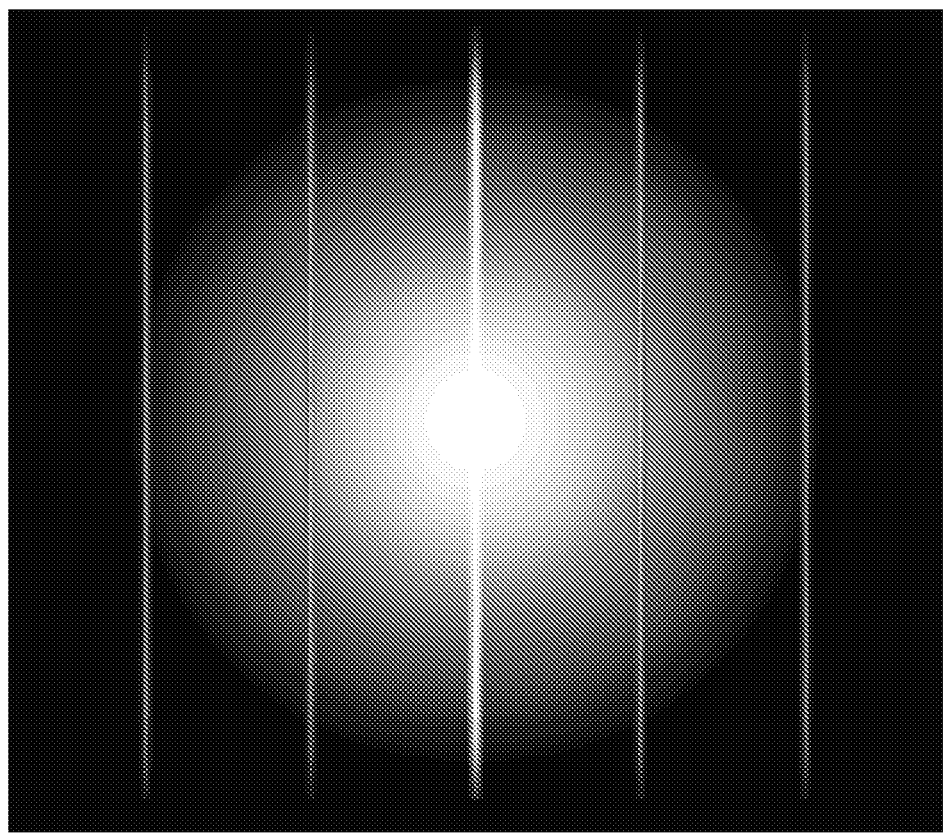
FIG. 4 illustrates a spot of light interacting with a diffraction grating.

A diffraction pattern formed by shining light on or through a laser ablated surface with a horizontal diffraction grating, such as the horizontal grating associated with the horizontal rows or raster lines of FIGS. 1 and 2, will include predominantly horizontal bands of light and dark. A diffraction pattern formed by shining light on or through a laser ablated surface with a vertical diffraction grating, such as the vertical grating associated with the generally aligned edges of individual laser spots of adjacent rows or raster lines of FIGS. 1 and 2, will include predominantly vertical bands of light and dark. FIG. 4 illustrates a vertical diffraction pattern that may be observed when white light is transmitted through or reflected from an area of a workpiece with a transparent substrate that includes a vertical diffraction pattern caused by a regular pattern of laser ablation laser spots. The light circular pattern in the center of FIG. 4 indicates the direct reflection of the incident light as visible to the naked eye. The example of FIG. 4 includes a vertical diffraction grating, with five vertical lines shown equally spaced and horizontally centered about the spot light source. The center band appears white and the outer bands include a rainbow gradient with white light separated into component colors. This effect is due to the different interference patterns of the different wavelengths of light.

A laser ablation process that results in diffraction gratings on the workpiece that produce an undesirable diffraction pattern when light is transmitted through or reflected from the ablated surface can be altered to lessen the appearance of the diffraction pattern as outlined below.

In one embodiment, the distance between adjacent laser spots is reduced in one or both directions. In the example of FIG. 1, for instance, one or both of distances D1 or D2 can be reduced. Such a reduction effectively increases the amount of overlap of adjacent laser spots. This may reduce the amount of residual material on the substrate or underlying coating and spread out the lines in the diffraction pattern since the diffraction grating is made up of a closer spacing of lines. This spreading out may reduce their intensity and reduce their appearance visually. This technique may also be particularly effective where the diffraction gratings are caused by residual material remaining on the substrate or underlying coating and/or where the substrate or underlying coating is not susceptible to alteration by the laser energy, as more overlap among laser spots results in more of the desired material being altered or removed along the process path. This method may also reduce the appearance of diffraction patterns by causing less damage or having less of an effect on the underlying substrate or coating by removing less material with each pulse.

One manner of achieving reduced spot-to-spot spacing is via reduced scanning speed in the process direction (x-direction of FIG. 1) and/or in the transverse direction (y-direction of FIG. 1). Another manner of achieving reduced spot-to-spot spacing is via increased laser pulse frequency, which is effective in the process direction. These techniques may also be combined, such as by increasing the laser pulse frequency, thereby reducing D1, and decreasing the scanning speed in the transverse direction, thereby reducing D1.

In other embodiments, at least a portion of the ablation pattern includes an irregularity. Since the regularity of the ablation pattern produced by constant pulse frequency and constant scan speeds is believed to be at least partly responsible for the appearance of diffraction patterns, introducing irregularities into the ablation pattern can help reduce the appearance.

Figure 5:
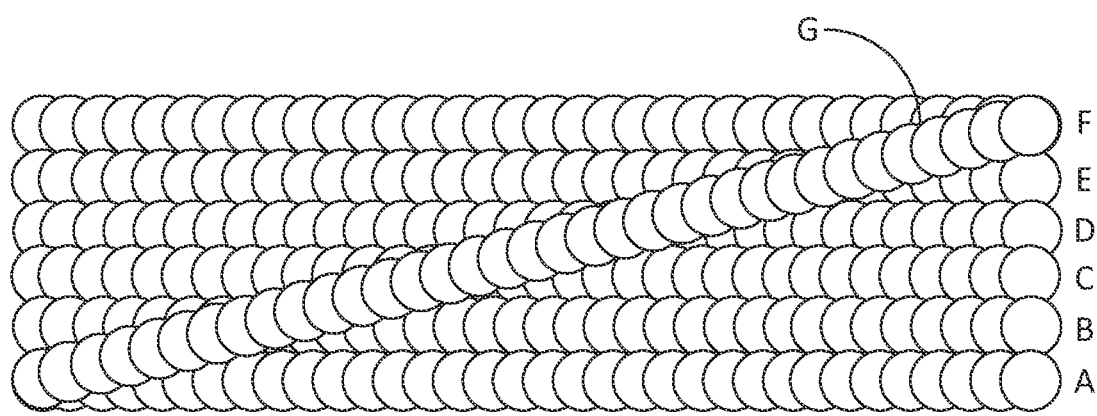
FIG. 5 is a schematic view of a laser-ablated surface with non-parallel raster lines.

As shown in FIG. 5, one technique for introducing irregularity to the ablation pattern is to configure the ablation process path so that at least one of the raster lines (e.g., at least one of rows A-G of FIG. 1, raster line G) is non-parallel with at least one other of the raster lines (e.g., raster lines A-F). In one embodiment the process path includes a plurality of raster lines at a plurality of different angles with respect to a reference line, such as a laser system axis. Some raster lines may be parallel, and even some adjacent raster lines may be parallel. But one portion of the ablated area includes at least one raster line that is not parallel with a raster line of another portion.

Another technique for introducing irregularity to the ablation pattern is to configure the ablation process path to include a curvilinear path. Even with a constant pulse frequency and constant velocity along the process path, a curvilinear ablation path will in most cases result in irregular D1 and/or D2 spacing. In one example, each of the raster lines lies along a sine wave and/or laser spots in adjacent raster lines lie along a sine wave. This technique may be referred to as adding "wobble" to the laser beam delivery system and changes D1 and/or D2 based on the wobble frequency. The wobble frequency can be chosen sufficiently high and/or the wobble amplitude can be chosen sufficiently large to effectively randomize the laser spot locations, thereby reducing or eliminating any diffraction grating and associated diffraction pattern in service.

In another embodiment, a plurality of different laser configurations is employed within the same ablation area. Different portions of the ablation area may be ablated at different laser configurations and/or the same portion of the ablation area may be ablated at more than one laser configuration. In one particular example, the same area of the workpiece is subjected to two different laser ablation process configurations. For instance, the same area of the workpiece may be ablated at two different laser pulse frequencies. The difference in pulse frequencies results in the laser spot edges being misaligned, thereby reducing the diffraction grating effect. In a particular embodiment, the two different laser pulse frequencies are selected to reduce or minimize the number of overlapping pulses between the two passes. Preferably, the two frequencies are not multiples of each other and do not have common factors. In embodiments where the two frequencies are multiples of each other or have common factors, a lower greatest common factor is preferable to a higher greatest common factor. For example, pulse frequencies of 625 kHz and 400 kHz have a greatest common factor of 25 kHz, which is preferable to the greatest common factor of 400 kHz associated with a 800 kHz and 400 kHz pulse frequency pairing. More than two different pulse frequencies may be employed.

In another example, the same area of the workpiece may be ablated at two different scan speeds. The effect is generally the same as employing two different pulse frequencies, with the spacing between laser spots in the first pass different from the spacing between laser spots in the second pass. The different speeds may also be selected to reduce or minimize the number of identical laser spot locations in the first and second passes.

In another example in which a plurality of different laser configurations is employed within the same ablation area, different portions of the ablation area are ablated with a single pass but at different laser configurations. For instance, ablation along one raster line may be performed at one combination of laser pulse frequency and scan speed, and ablation along one another raster line may be performed at a different combination of laser pulse frequency and scan speed. There are multiple variations possible. For example, raster lines at one laser pulse frequency may be interlaced with raster lines at a different laser pulse frequency. Or a laser pulse frequency and/or scan speed may be randomly selected for each raster line.

In yet another technique for reducing the appearance of diffraction gratings and patterns at a laser ablated surface, the laser beam is configured with a non-Gaussian energy profile across the beam width. A Gaussian energy distribution across the laser beam may be partially responsible for non-uniformity in material removal. In particular, some small but greater amount of material may be removed at the center of the beam, where the energy density is highest in a Gaussian beam, than at the edges of the beam. In one embodiment, the laser beam has a substantially flat energy distribution across the beam. A flat energy profile across the beam will reduce the likelihood of underlying substrate alteration at the center of the beam and the likelihood of residual material left at the edges of the beam, both of which may contribute to diffraction gratings and diffraction patterns.

Another process modification useful to reduce the appearance of diffraction gratings and diffraction patterns includes providing an index-matching fluid at the surface being ablated. An index matching fluid is a fluid, such as a liquid, with a refractive index between the refractive index of the material to be exposed by the ablation and the atmosphere in which the laser system operates. For instance, where it is desired to remove a metal coating from a glass substrate in an air atmosphere, an index-matching fluid has a refractive index between air and glass. Water is an example of an index-matching fluid in this particular instance. The refractive index of the index-matching fluid is preferably closer to the underlying substrate or coating that to the atmosphere. Use of an index-matching fluid, such as by immersing the surface to be ablated in the fluid during the ablation process, has been experimentally shown to reduce the formation of diffraction gratings at the ablated surface.

Another process variation that has been experimentally shown to reduce the presence of diffraction gratings at the ablated surface is to defocus the laser beam. In other words, laser ablation process is performed with the focal plane, at which the laser energy density is highest in the direction of propagation, located either above or below the material to be removed. In some embodiments, the location of the laser beam focal plane with respect to the surface to be ablated is a laser process parameter that is different at different portions of the workpiece area.

Any of the above-described process modifications can also be combined with one another or with other process modifications to reduce the appearance of diffraction gratings.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method comprising:
   providing a substrate having a coating disposed along a surface of the substrate; and
   performing a laser ablation process that removes the coating from at least a portion of the surface to generate a plurality of laser spots;
   wherein each of the plurality of laser spots is overlapped during the laser ablation process by adjacent laser spots to define an ablated area at the portion of the surface;
   wherein the plurality of laser spots form a plurality of lines of laser spots;
   wherein at least one line of the plurality of lines is nonparallel with at least one other line of the plurality of lines such that the at least one line is angled relative to the at least one other line; and
   wherein the substrate is transparent or reflective at the ablated area.

2. The method of claim 1, wherein the laser ablation process is performed at more than one scan speed.

3. The method of claim 1, wherein at least a portion of the laser ablation process is performed with a defocused laser beam.

4. The method of claim 1, wherein the laser ablation process uses at least one of a laser beam with a non-Gaussian energy profile or a flat energy profile.

5. The method of claim 1, wherein the laser ablation process includes use of an index-matching fluid.

6. The method of claim 1, wherein the laser ablation process produces a product.

7. The method of claim 6, wherein the product is a mirror.

8. The method of claim 1, wherein the laser ablation process uses at least one of (i) a decreased scan speed or (ii) an increased laser pulse frequency to increase an amount of overlap between the adjacent laser spots.

9. The method of claim 1, wherein the laser ablation process is performed at more than one laser pulse frequency.

10. The method of claim 1, wherein each of the plurality of lines includes wobble.

11. The method of claim 1, wherein the at least one line is a horizontal raster line.

12. The method of claim 1, wherein the at least one line is a horizontal raster line and the at least one other line is a line with wobble.

* * * * *